United States Patent
Blackman et al.

(10) Patent No.: US 6,811,109 B1
(45) Date of Patent: Nov. 2, 2004

(54) RETAINER FOR POWER-RETURN TAPE MEASURE SPRING

(75) Inventors: William C. Blackman, Raleigh, NC (US); Edgar T. Gilliam, Franklinton, NC (US)

(73) Assignee: Cooper Brands, Inc., Houston, TX (US)

( * ) Notice: Subject to any disclaimer, the term of this patent is extended or adjusted under 35 U.S.C. 154(b) by 0 days.

(21) Appl. No.: 10/420,252

(22) Filed: Apr. 22, 2003

(51) Int. Cl.⁷ .............................................. B65H 75/48
(52) U.S. Cl. ..................................... 242/375; 242/376
(58) Field of Search ......................... 242/375, 375.1, 242/375.2, 376, 376.1, 379; 33/761

(56) References Cited

U.S. PATENT DOCUMENTS

| | | | |
|---|---|---|---|
| 2,599,320 A | * 6/1952 | Dart | 242/375 |
| 2,727,701 A | * 12/1955 | Zelnick | 242/375 |
| 2,837,296 A | * 6/1958 | Zelnick | 242/377 |
| 3,216,117 A | * 11/1965 | Stowell | 33/769 |
| 3,716,201 A | * 2/1973 | West | 242/375.2 |
| 4,142,693 A | * 3/1979 | Czerwinski | 242/375 |
| 4,443,944 A | * 4/1984 | Beesley | 33/761 |
| 4,527,334 A | 7/1985 | Jones et al. | |
| 4,531,688 A | * 7/1985 | Gall | 242/375.1 |
| 4,583,294 A | 4/1986 | Hutchins et al. | |
| 4,663,854 A | * 5/1987 | Miller et al. | 33/767 |
| 4,730,783 A | 3/1988 | Lamson | |
| 4,907,348 A | 3/1990 | Hubbard, Jr. | |
| 4,976,048 A | 12/1990 | Blackman | |
| 4,982,910 A | * 1/1991 | Bickford | 242/375 |
| 4,986,487 A | 1/1991 | Irvin | |
| 5,894,678 A | 4/1999 | Masreliez et al. | |
| 6,053,447 A | 4/2000 | Omri | |
| 6,282,808 B1 | * 9/2001 | Murray | 33/769 |
| 6,349,482 B1 | 2/2002 | Gilliam | |
| 6,510,622 B2 | 1/2003 | Laughlin et al. | |

* cited by examiner

Primary Examiner—Kathy Matecki
Assistant Examiner—Sang Kim
(74) Attorney, Agent, or Firm—Coats & Bennett, P.L.L.C.

(57) ABSTRACT

A power-return tape measure uses a retainer to help keep a retraction spring in the proper position. The tape measure may have a reel with an interior central cavity with a post extending therethrough. A spring is wound substantially within the central cavity and mounted to the post so as to provide a retraction bias. A cap is secured to the reel so as to substantially enclose the reel's central cavity and the spring. The retainer is disposed between the spring and the cap. The cap has a first hole of a first size and the retainer has a second hole of a second, smaller, size. The post extends through the second hole with a sliding fit and through the first hole in spaced relation to the cap. The post and the retainer substantially close off the first hole. A main case substantially encloses the reel.

12 Claims, 5 Drawing Sheets

RETAINER FOR POWER-RETURN TAPE MEASURE SPRING

BACKGROUND OF THE INVENTION

Modern tape measures (or "tape rules") typically include a coiled tape that is spring-biased towards associated retracted position. A housing generally surrounds and protects the tape and a retraction spring and includes an opening through which a distal end of the tape extends. Typically, the tape measure housing consists of two housing halves that are joined together by one or more screws. In addition, one of the housing halves typically includes an inwardly pointing integral post that provides an anchoring point for one end of the retraction spring. During assembly, a blade winding reel is placed over the post with the retraction spring engaged by the post, and the other housing half is then joined to the first housing half with the reel captured therebetween. During use, the distal end of the tape is pulled away from the housing; when released, the spring pulls the tape back into the housing so that the tape returns to the retracted position. The retracted tape is wound on the reel in the form of a convolute coil, with the reel rotatably supported by the housing.

One important consideration when designing commercially available tape measures is that the tape measure should be able to function even after being repeatedly dropped, as frequently occurs on a construction site. Dropping the tape measure subjects the tape measure to substantial shock loadings that sometimes lead to the retraction spring becoming pinched or otherwise misaligned with respect to the anchoring post, quickly rendering the tape measure unusable.

Another consideration in designing tape measures is that the presence of dirt and other contaminants inside the housing may tend to degrade the performance of the retraction mechanism, by adding friction, increasing wear, and other mechanisms. However, providing a completely sealed housing is impractical, particularly given the need to pay out the tape measure blade in a convenient manner and the extreme cost pressures present in the marketplace.

Accordingly, there remains a need for improved tape measure designs, particularly those that have a more robust design, an preferably designs that address one or more of the problems outlined above.

SUMMARY OF THE INVENTION

The present invention is directed to a power-return tape measure, and/or a method of assembling a power-return tape measure, that employs a distinct internal retainer to help keep a retraction spring in the proper position relative to its anchoring post.

In one embodiment, the tape measure comprises a main case having first and second sidewalls and a peripheral wall extending between the sidewalls. A tape measure blade is coiled about a drum assembly in a conventional fashion. Also as is conventional, the drum assembly includes a drum having side flanges disposed generally parallel to the main case sidewalls and a core therebetween. The core of the drum generally defines a central cavity. The drum assembly further includes a drum cap secured to the drum so as to substantially enclose the central cavity. The drum assembly also includes a disc disposed internal to the central cavity and adjacent the drum cap. The drum cap has a first hole of a first diameter and the disc has a second hole of a second diameter smaller than the first diameter. The disc may be metallic and should have a periphery radially larger than the first hole. The power-return retraction spring is wound substantially or entirely within the central cavity and mounted to a post so as to provide a retraction bias for the tape blade. The post may include a slot, with the spring mating to the post via the slot. The post is disposed between the first and second sidewalls and extends through the central cavity, the first hole, and the second hole. The post extends through the second hole with a sliding fit and through the first hole without touching the drum cap. For example, the post may be spaced from the edge of the first hole so that there is a uniform gap therebetween. At least one of the sidewalls may include an inwardly pointing boss that cooperates with the first hole to provide a rotational bearing surface for the drum assembly. The other sidewall may also have a boss that cooperates with other features of the drum assembly to provide another bearing surface on the other side of the drum.

In another embodiment, the tape measure may comprise a tape measure blade coiled about a reel, the reel having an interior central cavity. A post extends through the central cavity. A spring is wound substantially or entirely within the central cavity and mounted to the post so as to provide a retraction bias for the tape blade. A cap is secured to the reel so as to substantially enclose the central cavity and the spring. A retainer is disposed between the spring and the cap. The retainer is distinct from both the reel and the cap and may advantageously be metallic and disc shaped. The cap has a first hole of a first size and the retainer has a second hole of a second size smaller than the first size. The post extends through the second hole with a sliding fit and through the first hole in spaced relation to the cap. The post should rotationally fixed relative to the main case. The post and the retainer substantially close off the first hole. A main case substantially encloses the reel.

In another embodiment, a method of assembling a tape measure includes providing a main case having a boss thereon; providing a reel having a central cavity; providing a tape measure blade convolutionally wound on the reel; providing a post having a slot therein; anchoring a spring to the post via the slot, the spring disposed substantially within the central cavity and operative to bias the blade towards being wound on the reel; providing a retainer having a first hole therein, the first hole sized to slidably engage the post; placing the retainer over an end of the post and moving the retainer toward the spring; capturing the retainer in the central cavity between the spring and a cap connected to the reel, the capturing including positioning the cap so that the post extends through the second hole therein in spaced relation to the cap; rotationally supporting the reel for rotation relative to the housing via the boss and second hole; and substantially enclosing the post, the reel, the spring, the retainer, and the cap in the housing. The main case may have distinct first and second case portions, with the first case portion including the boss.

DETAILED DESCRIPTION OF THE INVENTION

Figure 1:
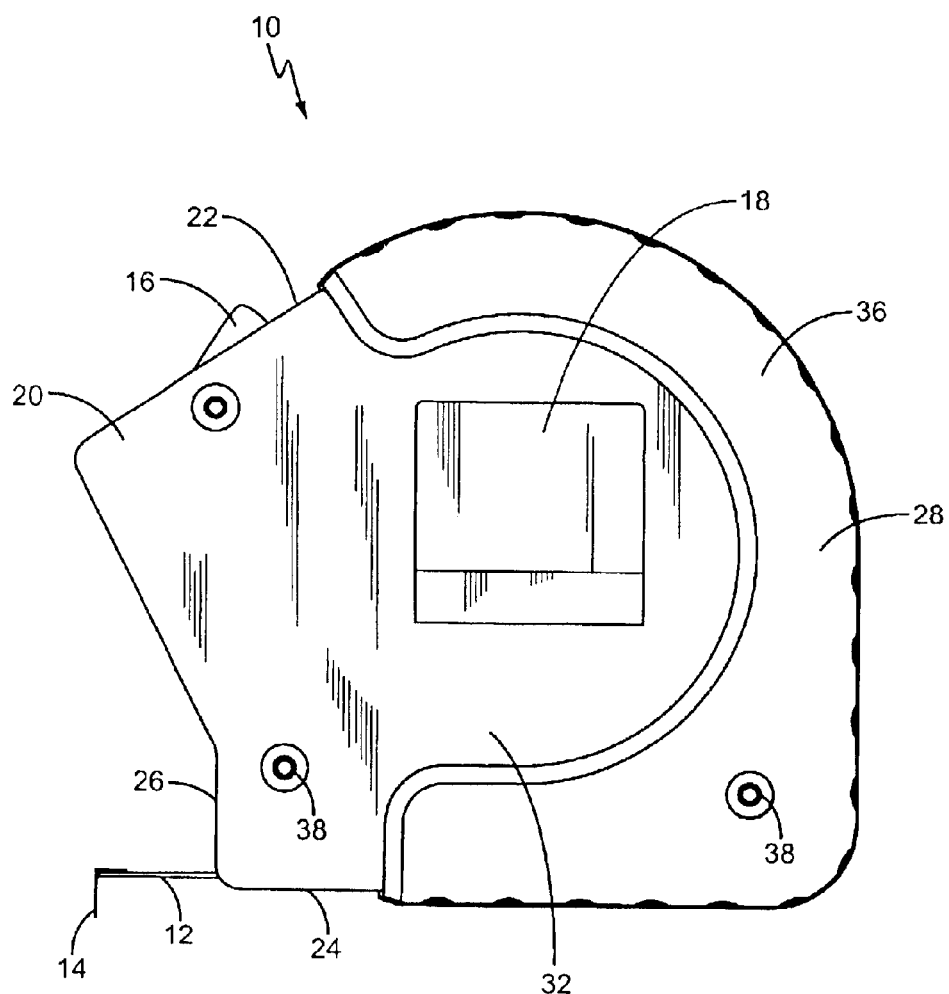
FIG. 1 is a side view of one tape measure embodiment constructed in accordance with the present invention.

As illustrated in FIG. 1, a tape measure, generally designated 10, is shown constructed according to the present invention. The tape measure 10 includes a coilable measuring tape or blade 12 and an associated housing 20. The distal end of the tape 12 may advantageously include an end hook 14 to prevent it from being retracted into the housing 20. A tape-biasing device, such as a retraction spring 99 (FIG. 5), is operatively connected to the tape 12 to bias the tape 12 towards a retracted orientation. A locking mechanism, including a toggle 16 or similar actuator is provided to aid in controlling the movement of the tape 12 into and out of the housing 20. One or both sides of the housing 20 may include a clip 18, as desired. As the general design and operation of power-return tape measures are well known in the art, additional detailed discussion of some components is omitted herein for brevity. However, additional discussion may be found in U.S. Pat. Nos. 4,527,334; 4,976,048; and 6,349,482, which are incorporated herein by reference.

Figure 2:
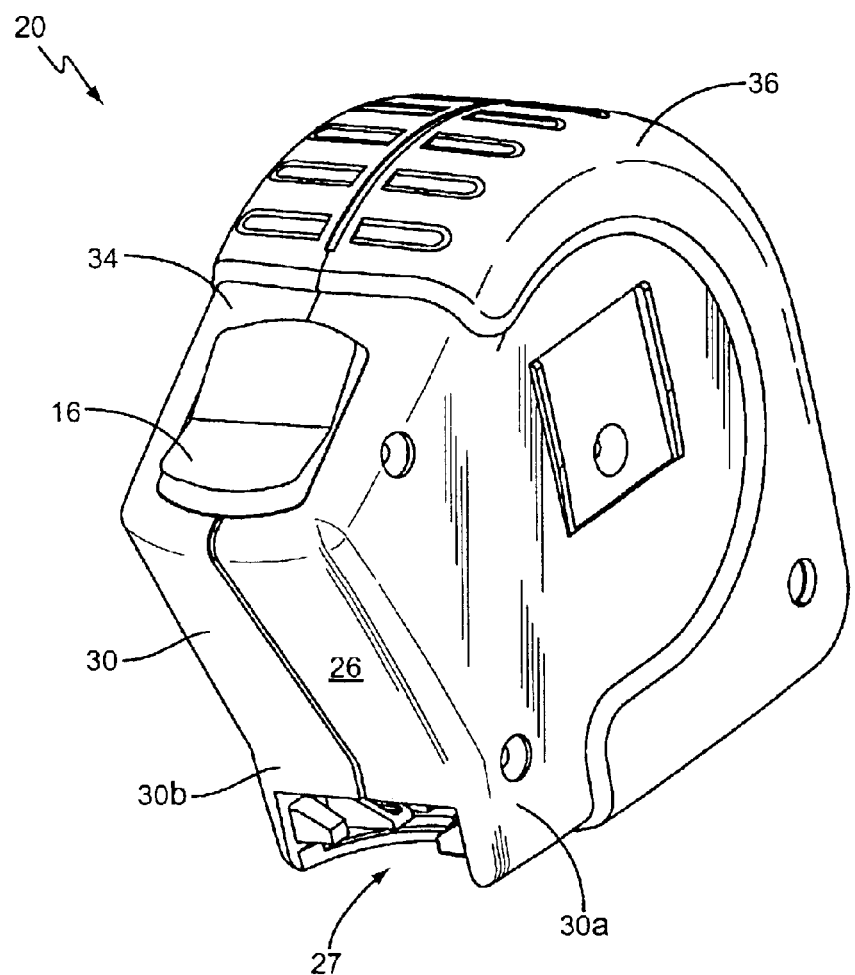
FIG. 2 is a perspective view of one embodiment of a tape measure housing in accordance with the present invention with some elements removed for clarity (e.g., screws, clip, etc.).

The housing 20 typically includes a main case or shell 30 and a grip element 36 mounted on the shell 30. The housing 20 preferably has a generally squarish shape, with a rounded upper-rear corner and may have a slightly projecting nose, as shown in FIGS. 1–2. The housing 20 includes an opposing pair of sidewalls 32 and an interconnecting peripheral wall 34 that help define an internal chamber 29 (FIG. 4) that houses the coiled portion of the tape 12, a suitable tape-biasing device, and portions of the locking mechanism. As shown in the Figures, the peripheral wall 34, and thus the shell 30, may be thought of as having a top 22, a bottom 24, a front 26, and a rear 28. The housing 20 typically includes an opening 27 near its lower-front corner that connects to the internal chamber 29. The distal end of the tape 12 extends through this opening 27. The housing 20 is preferably sized to fit within a user's hand, and also conveniently stored on a work belt or in a toolbox.

As shown in FIG. 2, the shell 30 may be constructed from two portions, a right-hand portion 30a and a left-hand portion 30b, joined together by suitable screws 38, as is known in the art. The external configurations of both the shell portions 30a,30b and the grip element portions 36 may advantageously be symmetrical if desired, but this is not required. Indeed, the two portions 30a,30b may have different internal and external configurations, depending on the internal workings of the tape measure 10, also as is known in the art. However, as the present invention primarily relates to the internal configuration of the tape measure 10, the details of the external configuration of the shell 30 are not important to understanding the present invention, and the following discussion will focus on the internal structure of the tape measure 10. More information on possible external configurations of the housing 20 may be found in U.S. patent application Ser. No. 10/174,629, filed Jun. 19, 2002 and entitled "Tape Measure Housing with Grip Element," which is incorporated herein by reference.

Figure 4:
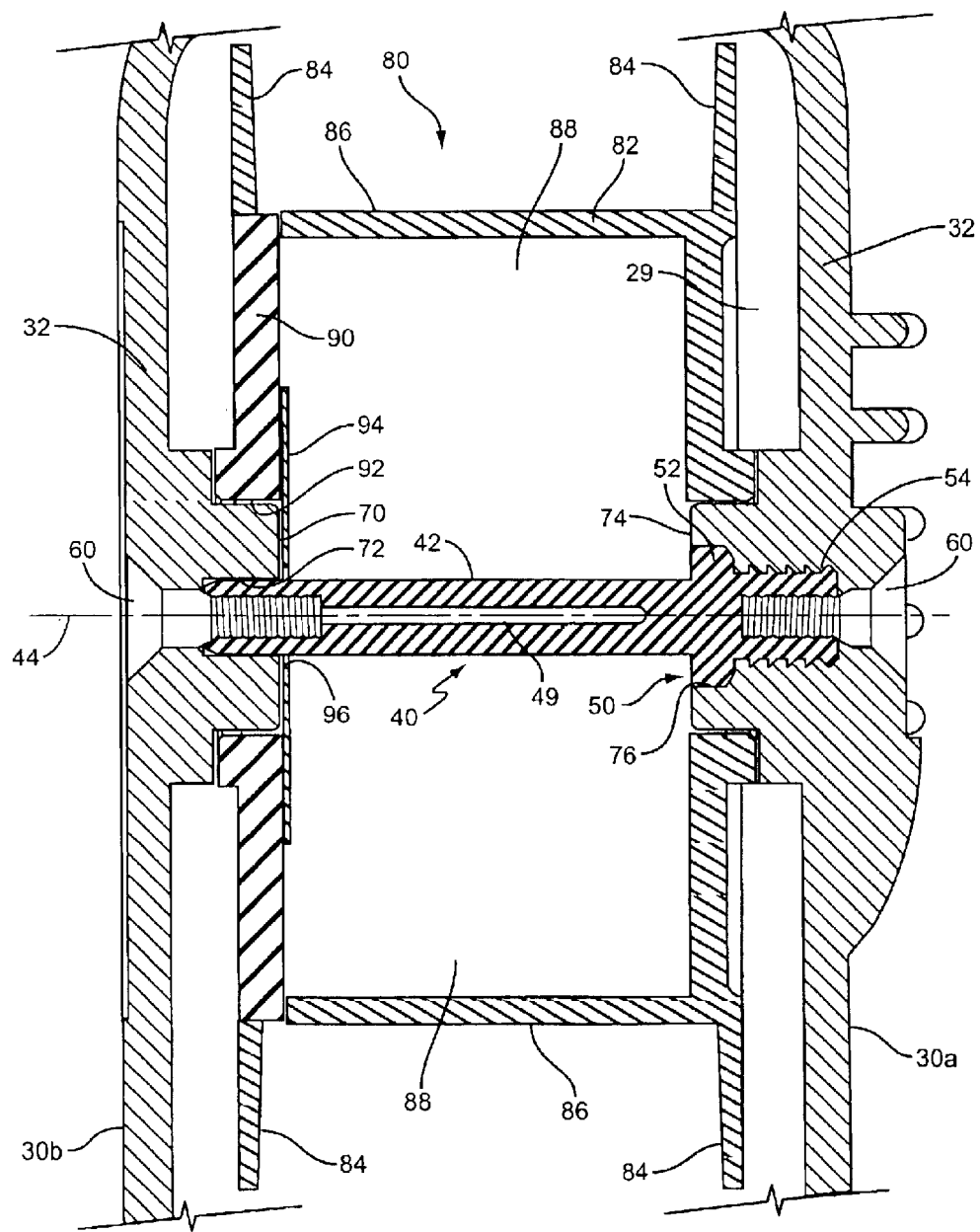
FIG. 4 shows a partial cross-sectional view of the center of the tape measure of FIG. 1 without the blade.
Figure 5:
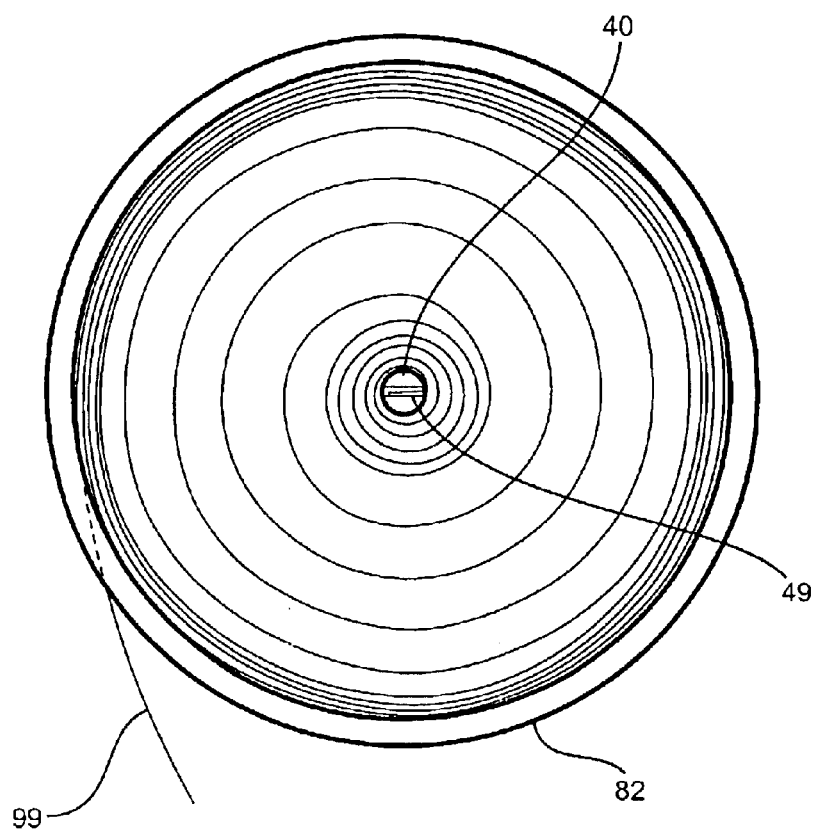
FIG. 5 shows a simplified side view of the retraction spring, post, and reel with the cap and retainer removed.

As shown in FIG. 4, a post 40 is disposed between the respective sidewalls 32, internal to the housing, and provides an anchoring point for the retraction spring 99 (FIG. 5). The post 40 may be formed integrally with one or both of the housing shell portions 30a,30b, or may be a distinct therefrom. As the later arrangement is believed advantageous, the discussion following will assume that the post 40 is a distinct part, although either arrangement is intended to fall within the scope of the present invention.

Figure 3:
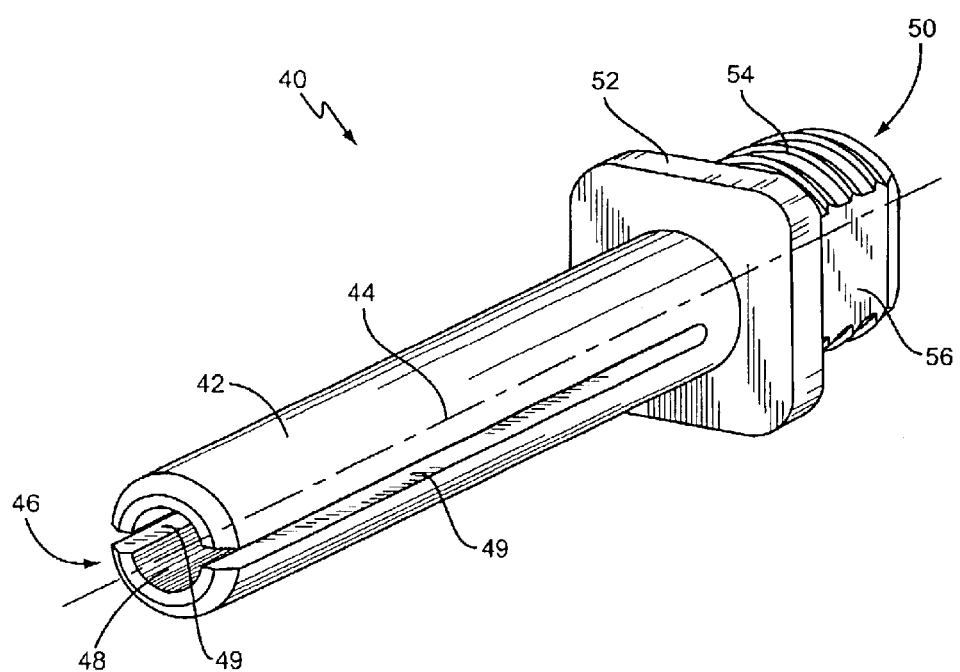
FIG. 3 is a perspective view of one embodiment of a post suitable for the present invention.

The post 40, shown in FIG. 3, may include a column portion 42 and an anchoring (or base) portion 50. The column portion 42 is generally elongate along axis 44, and may advantageously have a generally circular cross-section split by slot 49. The slot 49 extends from the terminal end 46 of post 40 toward the anchoring portion 50. The terminal end 46 of post 40 may advantageously include a hole 48 that is intended to accept a fastener 60, as described further below, and may include a chamfer if desired. The anchoring portion 50 of the post 40 includes a flange 52 and a plurality of ribs 54. The flange 52 is disposed proximate the column portion 42, and advantageously has a non-circular shape. The ribs 54 extend radially outward from the axis 44, and may therefore be considered as extending generally normal to the axis 44. There are preferably four ribs 54, but other numbers of ribs 54 may also be used. The ribs 54 have a profile that is generally flat on the side toward the flange 52, and slopes backward at an angle on the side away from the flange 52, such as at an angle of 15° to 45°, a preferably approximately 30°. The ribs 54 may be of suitable size, such as approximately 0.006 to 0.010 inches in height. The portion of anchoring portion 50 having the ribs 54 thereon may be round, or may advantageously be non-circular with appropriate flats 56 or the like. Thus, the ribs 54 may extend circumferentially entirely around the post 40, or may be interrupted by the flats 56. The end of the anchoring portion 50 opposite the column portion 42 may also advantageously include a hole (not shown), similar to hole 48 in size and function. For more details of the post 40, attention is directed to U.S. patent application Ser. No. 10/347,665, filed Jan. 21, 2003 and entitled "Tape Measure Housing with Post," which is incorporated herein by reference.

Referring to FIG. 4, the post 40 advantageously mates to the sidewalls 32 of the housing shell 30 using corresponding bosses 70,74 in the sidewalls 32. One sidewall, such as the sidewall 32 of the left half 30b of shell 30, may include boss 70 which is substantially round in shape with a recess 72 intended to accept the terminal end 46 of post 40. The other sidewall, such as the sidewall 32 of the right half 30a of shell 30, may include a boss 74 with a more complex recess 76 with an upper portion corresponding in shape to the flange 52, and a lower portion corresponding in shape to the ribbed area of the anchoring portion 50 of post 40. The lower portion of recess 76 may be round in shape if desired, and should be sized so that there is a sliding fit between the wall defining the recess 76 and the anchoring portion 50 at a point between the ribs 54. At least recess 72, and preferably both recesses 72,76, should include suitable through holes for allowing access to holes 48,58 in post 40 for securing fasteners 60 thereto.

The blade winding drum (or "reel") 82 typically takes the commonly known bobbin-like form with two parallel flanges 84 and an intervening core 86. The tape blade 12 is wound about the core 86 in a convolute coil, with the inner portion of the core 86 providing a central cavity 88 for substantially housing the retraction spring 99. The spring 99 is anchored on one end to the post 40, and provides a bias to retract the tape blade 12. The spring 99 is disposed at least substantially, and optionally entirely, inside the central cavity 88 (see FIG. 5), as is known in the art. The drum 82 is rotatably mounted in the housing 20, with the post 40 extending through the central cavity 88. As discussed above, the slot 49 of the post 40 typically engages and anchors one end of the spring 99. The spring 99 is held in the slot 49, at least partially, by a drum cap 90 and retainer 94. The drum cap 90 is preferably a generally annular plastic part that mates to the drum 82 so as to substantially enclose the central cavity 88 with the spring 99 therein. The drum cap 90 may mate to the drum 82 in any known fashion, with conventional interengaging snap fingers being a convenient approach. The center of the drum cap 90 includes a hole 92 for the post 40 to extend through. This hole 92 is sized substantially larger than the corresponding portion of the post 40 so that a gap is formed between the post 40 and the drum cap 90. The hole 92 is intended to fit around boss 70 so that the drum 82 is rotatably supported by the resulting bearing surface created thereby. In addition, a retainer 94 is disposed just internal of the drum cap 90. This retainer 94 preferably takes the form of a very thin metal disc, such as on the order of 0.003 inches thick. The retainer 94 also includes a hole 96, preferably in the center thereof, for the post 40 to extend through. This retainer hole 96 is substantially smaller than hole 92 of the drum cap 90. The hole 96 is preferably sized to be just larger than the corresponding portion of the post 40, so that there is a sliding fit therebetween.

In the assembled form, the retainer 94 is disposed around the post 40, between the spring 99 and the drum cap 90. Because the hole 96 in the retainer 94 matches the diameter of the post 40 (assuming the post is round), the retainer 94 acts to keep the spring 99 firmly located within the slot 49 of the post 40. However, the drum 82 is not limited to having rotational bearing surfaces that match the diameter of the post 40, but are instead allowed to be the larger size of the hole 92 in the drum cap 90. Thus, preferred embodiments of the present design allow for the drum 82 to have larger rotational bearing surfaces (hole 92 and boss 70), while also preventing the spring 99 from working itself laterally out of the slot 49 of post 40. In addition, the close correlation between the size of hole 96 and the size of post 40 allows the retainer 94 to also act as a seal against intrusion of dirt and other contaminants into the central cavity 88. Thus, the retainer 94 performs dual-functions in the preferred embodiments of the present design—retaining the spring 99 and better sealing the central cavity 88.

For ease of reference, the combination of the drum 82, the drum cap 90, and the retainer 94 may be referred to herein as the drum assembly 80.

The tape measure 10 may be assembled using mostly conventional techniques, with some modifications to accommodate that addition of the retainer 94. The assembly process begins with the anchoring portion 50 of post 40 being mated to the half 30a of shell 30 that includes boss 74. The end of the post 40 corresponding to the anchoring portion 50 is inserted into the recess 76 such that the ribs 54 bite into the boss 74. This mating of the post 40 with shell half 30a may be accomplished using an arbor press if desired. With the post 40 mated to the shell half 30a, the reel 82 and spring 99 are mounted to shell half 30a, with one end of spring 99 being inserted into slot 49 (FIG. 5). It should be noted that the reel 82 is intended to be rotatably supported by the bosses 70,74 of the housing 20 when fully assembled. The reel 82 is then temporarily clamped to the shell half 30a and the "free end" of spring 99 is then rotated about the reel 82 so that a preload is placed on the spring 99, typically using a powered winding tool/fixture. The free end of the spring 99 is routed out of the shell half 30a, the retainer 94 placed over the spring 99 with the post 40 extending through hole 96, and the retainer 94 slid down the post 40 towards the spring 99. The drum cap 90 is then snapped onto the drum 82, with the post 40 extending through hole 92, but spaced from the edges of hole 92 (preferably uniformly spaced). The addition of drum cap 90 substantially encloses the central cavity 88 of the drum 82 with the spring 99 and retainer 94 captured therein. Indeed, the drum cap 90 pushes the retainer 94 laterally against the spring 99 in preferred embodiments. The tape blade 12 (with hook 14 attached) is then connected to the free end of the spring 99, and the spring 99 released so that the blade 12 is wound onto the reel 82. Preferably, the convolute coil formed by the blade 12 wrapped on the reel 82 is not higher than the reel's flanges 84, but this is not required. The locking mechanism (e.g., toggle 16, etc.) and other relevant internal components are then added along with the other half of the shell 30b. Screws 38 are added to hold the housing halves 30a,30b together. The post mounting screws 60, if used, are inserted through the corresponding sidewalls 32 and screwed into their respective holes in post 40, thereby very firmly mounting the post 40 to the shell 30. These holes in post 40 may be threaded, or alternatively the post mounting screws 60 may be self-tapping. If desired, one of the post mounting screws 60 may be used to attach the belt clip 18. From this point, the assembly of the tape measure 10 continues in a conventional fashion, e.g., labels are added, testing, etc.

Shell 30, drum 82, and drum cap 90 are preferably made from a durable material such as a hardened plastic (e.g., ABS, polycarbonate, or the like). The post 40 is preferably distinct from the shell 30, may be made from a different material. Preferably, post 40 is constructed from metal, such as steel or zinc alloys (e.g., a zinc-aluminum-magnesium-copper alloy known as zamak-5), using a die cast process. Using a metallic post 40 allows the post 40 to be of a smaller radial size while still retaining the requisite strength. The retainer 94 may be made from suitable plastics, but is preferably metallic.

It should be understood that the tape measures 10 of the present invention may also include other features, such as shock-absorbing bumpers proximate the opening 27, specially coated blades 12, reinforcing hooks 14, various locking mechanisms, and like, all of which are known in the art.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A power-return tape measure, comprising:

a main case having first and second sidewalls and a peripheral wall extending between said sidewalls;

a tape measure blade coiled about a drum assembly, said drum assembly including a drum having side flanges disposed generally parallel to said main case sidewalls and a core therebetween, said core generally defining a central cavity;

said drum assembly further including a drum cap secured to said drum so as to substantially enclose said central cavity, said drum cap including a first hole of a first diameter;

said drum assembly further including a disc disposed adjacent said drum cap and internal to said central cavity, said disc including a second hole of a second diameter smaller than said first diameter;

a post disposed between said first and second sidewalls and extending through said central cavity, said first hole, and said second hole;

a spring wound substantially within said central cavity and mounted to said post so as to provide a retraction bias for said tape blade; and wherein said post extends through said second hole with a sliding fit and through said first hole without touching said drum cap.

2. The tape measure of claim 1 wherein said disc is metallic.

3. The tape measure of claim 1 wherein said post includes a slot and wherein said spring mates to said post via said slot.

4. The tape measure of claim 1 wherein at least one of said sidewalls includes an inwardly pointing boss that cooperates with said first hole to provide a bearing surface for said drum assembly.

5. The tape measure of claim 1 wherein said disc is sized radially larger than said first hole.

6. A power-return tape measure, comprising:

a tape measure blade coiled about a reel, said reel having an interior central cavity;

a post extending through said central cavity;

a spring wound substantially within said central cavity and mounted to said post so as to provide a retraction bias for said tape blade;

a cap secured to said reel so as to substantially enclose said central cavity and said spring, said cap including a first hole of a first size;

a retainer disposed between said spring and said cap, said retainer including a second hole of a second size smaller than said first size;

wherein said post extends through said second hole with a sliding fit and through said hole in spaced relation to said cap; and a main case substantially enclosing said reel.

7. The tape measure of claim 6 wherein said post is rotationally fixed relative to said main case.

8. The tape measure of claim 6 wherein said retainer is distinct from both said reel and said cap.

9. The tape measure of claim 6 wherein said retainer is metallic and disc shaped.

10. The tape measure of claim 6 wherein said post and said retainer substantially close off said first hole.

11. A method of assembling a tape measure, comprising:

providing a main case having a boss thereon;

providing a reel having a central cavity;

providing a tape measure blade convolutionally wound on said reel;

providing a post having a slot therein;

anchoring a spring to said post via said slot, said spring disposed substantially within said central cavity and operative to bias said blade towards being wound on said reel;

providing a retainer having a first hole therein, said first hole sized to slidably engage said post;

placing said retainer over an end of said post and moving said retainer toward said spring;

capturing said retainer in said central cavity between said spring and a cap connected to said reel, said capturing including positioning said cap so that said post extends through said second hole therein in spaced relation to said cap;

rotationally supporting said reel for rotation relative to said main case via said boss and second hole; and substantially enclosing said post, said reel, said spring, said retainer, and said cap in said housing.

12. The method of claim 11 wherein providing said main case comprises providing distinct first and second case portions, wherein said first case portion includes said boss.

* * * * *